(12) United States Patent
Ward

(10) Patent No.: US 8,301,162 B2
(45) Date of Patent: Oct. 30, 2012

(54) TAG FREQUENCY CONTROL

(75) Inventor: Andrew Martin Robert Ward, Cambridge (GB)

(73) Assignee: Ubisense Limited, Cambridge (GB)

( * ) Notice: Subject to any disclaimer, the term of this patent is extended or adjusted under 35 U.S.C. 154(b) by 76 days.

(21) Appl. No.: 12/915,325

(22) Filed: Oct. 29, 2010

(65) Prior Publication Data

US 2011/0039591 A1 Feb. 17, 2011

Related U.S. Application Data

(62) Division of application No. 11/569,891, filed as application No. PCT/GB2005/002154 on May 31, 2005, now Pat. No. 8,045,930.

(51) Int. Cl.
*H04Q 5/22* (2006.01)

(52) U.S. Cl. ............... 455/456.1; 455/522; 455/502; 455/41.2; 455/456.2; 455/141; 455/71; 455/119; 455/259; 455/260; 455/67.14; 455/69; 455/444; 455/414.2

(58) Field of Classification Search .......... 455/500, 455/68, 69, 67.1, 33.1, 70, 71, 76, 10, 3.2, 455/265, 260; 375/256, 200, 333, 259, 239; 370/280, 110.1, 105.1; 340/10.1, 10.42

See application file for complete search history.

(56) References Cited

U.S. PATENT DOCUMENTS

| | | | |
|---|---|---|---|
| 5,450,617 A | 9/1995 | Moore | |
| 5,515,401 A | 5/1996 | Takenaka et al. | |
| 5,565,858 A | 10/1996 | Guthrie | |
| 5,687,169 A | 11/1997 | Fullerton | |
| 5,794,119 A | 8/1998 | Evans et al. | |
| 5,870,385 A | 2/1999 | Ahmadi et al. | |
| 5,913,171 A | 6/1999 | Solonen et al. | |
| 7,006,838 B2* | 2/2006 | Diener et al. | 455/456.1 |
| 7,228,228 B2* | 6/2007 | Bartlett et al. | 701/517 |

(Continued)

FOREIGN PATENT DOCUMENTS

| | | |
|---|---|---|
| EP | 1168617 A2 | 2/2002 |
| WO | WO 03098528 A2 | 11/2003 |

OTHER PUBLICATIONS

International Search Report in International Application No. PCT/GB2005/002154, 9 pgs. (mailed Dec. 13, 2005).

*Primary Examiner* — Matthew Anderson
*Assistant Examiner* — Ganiyu A Hanidu
(74) *Attorney, Agent, or Firm* — Rothwell, Figg, Ernst & Manbeck PC

(57) ABSTRACT

A communication system comprising one or more transceiver units of a first type and one or more transceiver units of a second type capable of communicating with the transceiver units of the first type; each transceiver unit of the first type comprising: a frequency comparison unit for comparing the frequency of a signal received from a transceiver unit of the second type with a reference frequency; a feedback signal generator for generating a feedback signal dependent on the result of that comparison; and a transmitter for transmitting that signal to the transceiver unit of the second type; and each transceiver unit of the second type comprising: a local frequency reference unit on which the frequency of signals transmitted by it are dependent; and a frequency adjustment unit for receiving the feedback signal and adjusting the local frequency reference unit in dependence on the feedback signal.

23 Claims, 5 Drawing Sheets

U.S. PATENT DOCUMENTS

| | | | |
|---|---|---|---|
| 7,411,921 B2 * | 8/2008 | Strong et al. | 370/328 |
| 7,725,111 B2 * | 5/2010 | Dressler et al. | 455/456.1 |
| 7,764,231 B1 * | 7/2010 | Karr et al. | 342/457 |
| 2002/0175805 A9 * | 11/2002 | Armstrong et al. | 340/10.31 |
| 2004/0185873 A1 | 9/2004 | Gilkes et al. | |
| 2004/0203361 A1 | 10/2004 | Belcher et al. | |
| 2004/0214538 A1 * | 10/2004 | Ballantyne et al. | 455/141 |
| 2007/0153873 A1 * | 7/2007 | Fullerton | 375/130 |

* cited by examiner

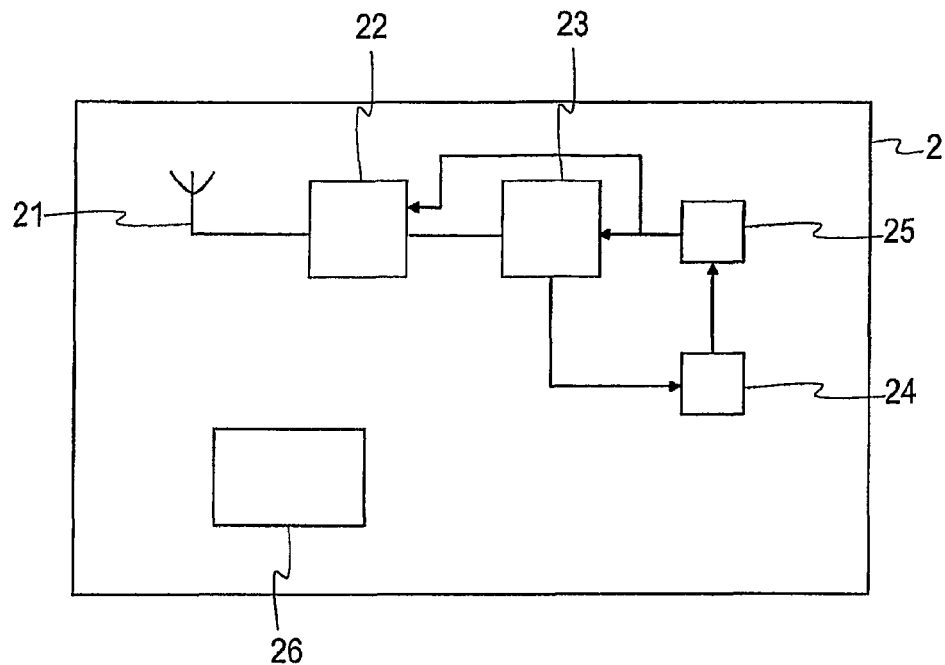

FIGURE 4

2: Base station determines offset of tag frequency reference from "good" base station reference

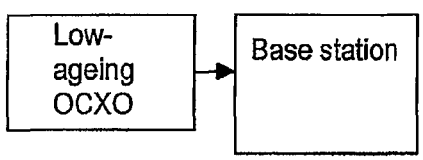 1: Tag sends UWB ranging signal to base station to indicate tag position

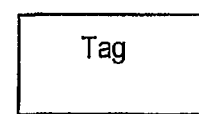

3: Infrastructure calculates appropriate correction for tag reference to bring it in line with good base station reference, and sends this value to the tag over the conventional wireless link 4: Tag adjusts TCXO frequency accordingly

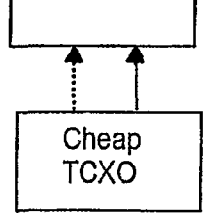

FIGURE 5

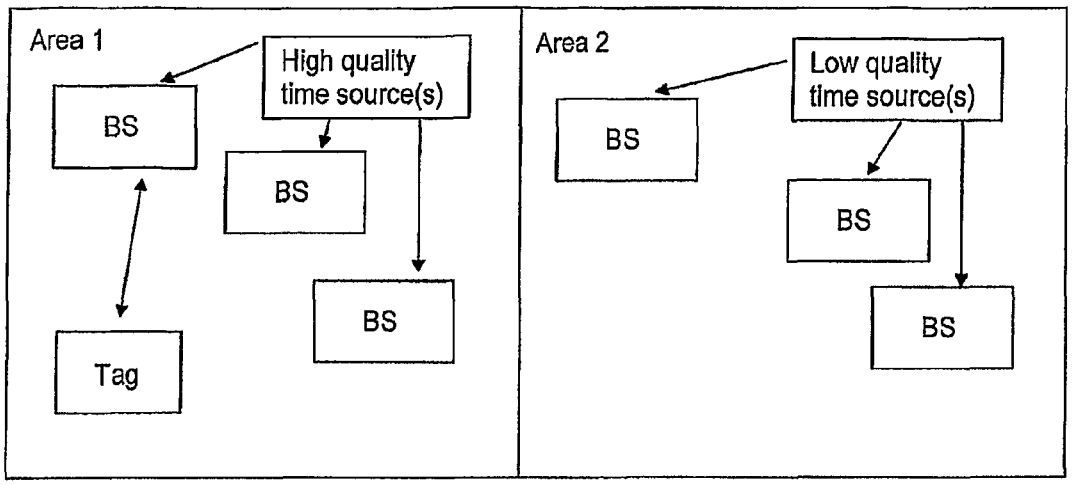

1: Tag with low-quality reference communicates with base station(s) [BS] with high-quality reference(s) and subsequently has its local reference suitably adjusted.

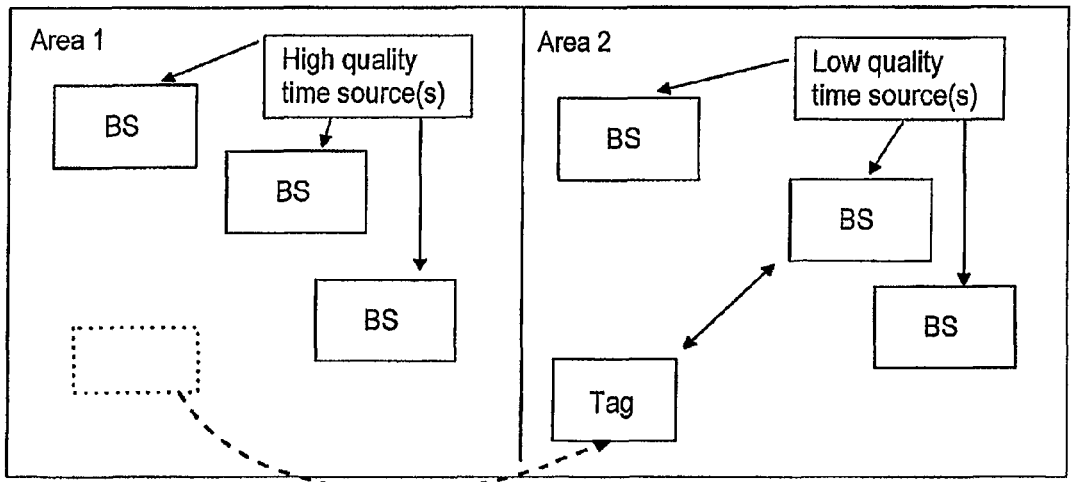

3: Tag moves to new area, and base station(s) there use the newly-compensated tag reference to correct their local reference(s). Base stations in different areas all communicate with a database, so know which tags have recently corrected references.

TAG FREQUENCY CONTROL

CROSS REFERENCE OF RELATED APPLICATION

This application claims the benefit under 35 U.S.C. §120(e) of the filing date of non-provisional patent application Ser. No. 11/569,891 filed May 3, 2007, which is a national phase of PCT/GB2005/002154 filed May 31, 2005, and designating the United States, the respective disclosures of which are incorporated herein by reference.

FIELD OF THE INVENTION

This invention relates to frequency control in a communication system, especially a radio communication system.

BACKGROUND OF INVENTION

A number of communication systems have been proposed for allowing the location of objects to be determined. Typically, a transmitter is co-located with an object whose location is to be determined. Signals from the transmitters are received by receivers which are installed at known locations. By measuring one or more characteristics of the communications between the transmitters and receivers the locations of the transmitters relative to the receivers can be estimated. In some systems the direction of communication is reversed: the transmitters are installed at fixed locations and the receivers are co-located with the objects. In others fixed transceivers are installed at the fixed locations and mobile transceivers are co-located with the objects, and bidirectional communication between the fixed and the mobile transceivers is possible. It is possible for the transmitter and the receivers to move, provided one set do so in a predictable way. For instance in the Global Positioning System (GPS) the locations of the satellite transmitters varies in a way that is known to the receivers.

When the objects that are to be located are within buildings there can be severe multipath effects which can hinder the accurate determination of the objects' locations. Because of this, ultra-wideband (UWB) radio is particularly promising for object positioning systems. By using short-pulse electromagnetic signals, UWB radio avoids many of the problems associated with conventional in-building radio positioning technology.

UWB communications systems using trains of pulses are discussed in the following papers: Multiple Access with Time-Hopping Impulse Modulation, R. A. Scholtz Invited Paper, IEEE MILCOM'93, Boston, Mass., Oct. 11-14, 1993 (http://www.timedomain.com/Files/downloads/techpapers/Sholtz.pdf); PulsON Technology Overview, A. Petroff and P. Withington, Time Domain Corporation. (http://www.timedomain.com/Files/downloads/techpapers/PulsONOverview7_01.pdf).

Numerous types of UWB radio systems exist. Several of them involve receivers at known locations that receive trains of low-power radio pulses sent by transmitters which are each co-located with an object whose location is to be determined. The receivers then integrate the energy in several pulses to recover the incoming signal. A difficulty of such systems is that there must be very tight synchronisation between the transmitters and the receivers since if the receiver is to recover the maximum incoming signal energy (and hence recover any incoming data with maximum reliability) its expected frequency of pulse arrival must match exactly the transmitter's frequency of pulse dispatch. This is illustrated in FIG. 1. FIG. 1 illustrates a train of pulses being sent from a transmitter to a receiver. If the received pulses are sampled at the correct frequency synchronisation then a strong impulse is detected. If the received pulses are sampled at an offset frequency synchronisation then a weak impulse is detected. Similar considerations apply in fields other than UWB radio systems.

In a typical UWB locationing system in which transmitters (tags) are located at the objects to be located and receivers (base stations) are installed at known locations, it could be anticipated that the clocks controlling the tag and base station must generate the same frequency to an accuracy of plus or minus around 1 ppm (parts-per-million) for reasonable performance. This figure would be a total frequency error budget taking both ends of the link into account. Thus, for example, if the base station had a theoretically perfect clock which operated exactly at the nominal pulse repetition frequency (PRF), the clocks on the tag could drift +/−1 ppm in frequency from the nominal PRF. Alternatively, base station clocks and tag clocks could both be permitted to drift up to +/−0.5 ppm from the nominal clock frequency, the worst case then being when a tag with a +0.5 ppm clock is communicating with a base station with a −0.5 ppm clock, or when a tag with a −0.5 ppm clock is communicating with a base station with a +0.5 ppm clock, but even these cases are within the anticipated frequency error budget.

Tags and base stations will typically have an on-board frequency reference oscillator, normally a quartz oscillator, acting as a clock for its transmissions and its reception operations. The accuracy of such an oscillator is generally affected by a number of factors:

initial manufacturing tolerance
  manufacturing effects (e.g. extreme temperature during soldering)
  temperature during operation
  crystal ageing Some of these effects can be compensated for after the tag and base station devices have been manufactured. Each device can be compared with a 'known, good' frequency reference, and its frequency can then be tuned (e.g. by mechanical or electrical trimming) to bring it into synchronisation with the reference. This method can be used to compensate for any initial offset or any fixed offset introduced during manufacture. However, it cannot compensate for changes that occur during operation of the device, for example temperature-related effects and crystal ageing.

UWB positioning links differ from many standard communications links because they are typically is extremely sensitive to tag-infrastructure frequency offsets, which must be kept very small (typically less than ~1 ppm) in order for the link to be established at all. Implementation of such systems therefore normally demands tag and infrastructure frequency references that are not greatly affected by temperature. As a result, the long-term (ageing) drift of the crystal is more problematic than the short-term (temperature) drift.

It might be thought that after compensating for initial fixed offsets, one could employ crystal references that did not age significantly, and that were relatively insensitive to changes in ambient temperature. However, in a practical commercial system power and cost constraints mean that the quality of oscillator that can be used is severely limited. In most applications the best oscillators that can be used for tags are temperature-compensated crystal oscillators (TCXOs), and for base stations oven compensated crystal oscillators (OCXOs). TCXOs typically have a best accuracy over temperature (in the range from 0 to 50° C.) of around +/−0.3 ppm, although +/−0.5 ppm TCXOs are significantly cheaper. A +/−0.3 ppm TCXO on base stations and a +/−0.5 ppm TCXO on the tags, both tuned after manufacture, would initially satisfy the +/−1 ppm total frequency budget. OCXOs are more expensive and power hungry, but have an accuracy over temperature of better than +/−0.1 ppm, and if installed at base stations would give more margin on the frequency budget.

However, ageing effects will be expected to change the frequency of a TCXO over the first year by +/−1 ppm, and over three years the frequency shift can be up to +/−3 ppm. An OCXO will be expected to age by up to +/−0.5 ppm per year. It therefore appears that in order to make such a communication system work over long periods of time without high maintenance overheads or excessively extensive components it will be necessary to compensate for the effects of crystal ageing in the tags and base stations.

Frequency control techniques are well-known in traditional radio communications systems. In particular, some narrowband FM systems provide an automatic frequency control (AFC) mechanism to allow a receiver to modify its operating frequency to match a transmitter which may have drifted off-centre. The Chipcon CC1020 FM transceiver manufactured by Chipcon AS (www.chipcon.com) is an example of a radio communications device with this capability. However, frequency adjustment schemes of this type are generally intended to compensate for short-term drift due to temperature changes, and so the basic mechanisms normally provide only for frequency optimisation of a link that has already been established. In contrast, the present invention relates to techniques suitable for use in establishing new links. According to preferred aspects of the present invention, measurements taken whilst that link is in operation can then be used to compute compensation values which will be stored and used for the next communication attempt.

SUMMARY OF THE INVENTION

The present invention aims to at least partially address the need for providing synchronisation between transmitter and receiver, especially in situations where such synchronisation is needed for link establishment, and especially for UWB radio systems.

According to the present invention there is provided a communication system comprising one or more transceiver units of a first type and one or more transceiver units of a second type capable of communicating with the transceiver units of the first type; each transceiver unit of the first type comprising: a frequency comparison unit for comparing the frequency of a signal received from a transceiver unit of the second type with a reference frequency; a feedback signal generator for generating a feedback signal dependent on the result of that comparison; and a transmitter for transmitting that signal to the transceiver unit of the second type; and each transceiver unit of the second type comprising: a local frequency reference unit on which the frequency of signals transmitted by it are dependent; and a frequency adjustment unit for receiving the feedback signal and adjusting the local frequency reference unit in dependence on the feedback signal.

Preferably each transceiver unit of the first type is arranged to, during a communication session with a transceiver unit of the second type, repeatedly perform the said comparison, generate a feedback signal as a result of that comparison and transmit that signal to the said transceiver unit of the second type.

Preferably the frequency adjustment unit comprises a memory and a storage unit for storing in the memory adjustment data dependent on the feedback signal, and is arranged to adjust the local frequency reference unit in dependence on the adjustment data.

Preferably the memory is arranged to store the adjustment data for use after the completion of a communication session with a transceiver unit of the first type.

Preferably the communication system comprises at least one transceiver unit of a third type with which the transceivers of the second type are capable of communicating; and a database accessible to the transceiver units of the first type and the transceiver units of the third type; and wherein: the transceiver units of the first type are arranged to, on comparing the frequency of a signal received from a transceiver unit of the second type with the reference frequency, store in the database an indication of the result of that comparison together with an identity of that transceiver unit of the second type; and each transceiver unit of the third type comprises: a local frequency reference unit on which the operating frequency of that transceiver unit is dependent; and a frequency adjustment unit for, on receiving a signal from a transceiver unit of the second type for which the database holds an indication of the result of a comparison, comparing the frequency of that signal with the frequency of the respective local frequency reference unit and adjusting the frequency reference unit in accordance with that comparison.

The frequency adjustment unit of the transceiver unit of the third type may be arranged to perform the said adjustment only if the indication held in the database meets at least one further criterion, for example if the indication is stored together with a record that indicates that the transceiver unit of the second type for which the indication is held has had its reference frequency updated within a predetermined time period.

The feedback signal generator may be arranged to generate the feedback signal dependent on the result of a plurality of comparisons of the frequency of a signal received from the transceiver unit of the second type with the reference frequency. The said comparisons are suitably performed over a period of at least 24 hours, most preferably a period that is an integer multiple of 24 hours.

According to a second aspect of the invention there is provided a communication system comprising: one or more transceiver units of a first type; a data store accessible to the or each transceiver unit of the first type; two or more transceiver units of a second type, the transceiver units of a second type being capable of communicating with the transceiver units of the first type, and each transceiver unit of the second type comprising a local frequency reference unit on which the frequency of signals transmitted by it are dependent; wherein: at least one transceiver unit of the first type comprises a frequency comparison unit for comparing the frequency of a signal received from a transceiver unit of the second type with a reference frequency, and a feedback data storage unit for storing in the data store feedback data representative of the result of that comparison in respect of that transceiver unit of the second type; and the or each transceiver unit of the first type comprises a frequency adjustment unit for adjusting the transmit and/or receive frequency of the transceiver unit of the first type for communication with one of the transceiver units of the second type in accordance with feedback data stored in respect of that transceiver unit of the second type.

The or each transceiver unit of the first type may be arranged to communicate with a single one of the transceiver units of the second type at any one time.

According to a third aspect of the present invention there is provided a communication system comprising: one or more transceiver units of a first type; two or more transceiver units of a second type, the transceiver units of a second type being capable of communicating with the transceiver units of the first type, and each transceiver unit of the second type comprising a local frequency reference unit on which the frequency of signals transmitted by it are dependent; wherein at least one transceiver unit of the first type comprises: a frequency comparison unit for comparing the frequency of signals received from transceiver units of the second type with a reference frequency and forming an offset signal representative of the average offset between the frequency of the received signals and the reference frequency; a frequency adjustment unit for adjusting the reference frequency in accordance with the offset signal.

Preferably each transceiver unit of the first and third types is a base station. Preferably each transceiver unit of the second type is an identification unit.

Preferably each transceiver unit of the second type has a unique identity within the system. Preferably each transceiver unit of the second type is a mobile transceiver.

Preferably each transceiver unit of the second type is a radio tag. Preferably each transceiver unit of the second type comprises a power source.

Preferably the system is a locationing system and is capable of determining the location of a transceiver unit of the second type relative to the or each transceiver unit of the first type.

Preferably communication between the transceiver units of the first type and the transceiver units of the second system is by ultrawideband radio.

Preferably the communication system is such that each transceiver unit of the second type can establish communication with each transceiver unit of the first type only if the operating frequencies of those transceiver units are synchronised to better than 2 ppm.

Preferably the or each local frequency reference unit is an oscillator and the or each frequency adjustment unit is capable of altering the oscillation frequency of the oscillator.

According to an aspect of the present invention there is provided a method of adjusting a local frequency reference of a transceiver unit in a communication system comprising one or more transceiver units of a first type and one or more transceiver units of a second type capable of communicating with the transceiver units of the first type; the method comprising: comparing the frequency of a signal received from a transceiver unit of the second type with a reference frequency; generating a feedback signal dependent on the result of that comparison; transmitting that signal to the transceiver unit of the second type; and at the transceiver unit of the second type: receiving the feedback signal; and adjusting a local frequency reference unit on which the frequency of signals transmitted by the transceiver unit of the second type are dependent in dependence on the feedback signal.

According to an aspect of the present invention there is provided a method for adjusting the transmit and/or receive frequency of a transceiver unit in a communication system comprising one or more transceiver units of a first type, the transceiver units of a second type being capable of communicating with the transceiver units of the first type; the method comprising: comparing the frequency of a signal received by a transceiver of the first type from a transceiver unit of the second type with a reference frequency; storing feedback data representative of the result of that comparison in respect of that transceiver unit of the second type; and adjusting the transmit and/or receive frequency of the transceiver unit of the first type for communication with one of the transceiver units of the second type in accordance with feedback data stored in respect of that transceiver unit of the second type.

According to an aspect of the present invention there is provided a method for adjusting a reference frequency of a transceiver unit in a communication system comprising one or more transceiver units of a first type, and two or more transceiver units of a second type, the transceiver units of the second type being capable of communicating with the transceiver units of the first type, each transceiver unit of the second type comprising a local frequency reference unit on which the frequency of signals transmitted by it are dependent; the method comprising: comparing the frequency of signals received from transceiver units of the second type with a reference frequency; forming an offset signal representative of the average offset between the frequency of the received signals and the reference frequency; and adjusting the reference frequency in accordance with the offset signal.

According to an aspect of the present invention there is provided a communications system comprising: one or more transceivers of a first type; a database accessible to the transceiver units of the first type; one or more transceiver units of a second type, the transceiver units of a second type being capable of communicating with the transceiver units of the first type, and each transceiver unit of the second type comprising a local frequency reference unit on which the frequency of signals transmitted by it are dependent; wherein at least two of the transceiver units of the first type comprise: a local frequency reference unit; a frequency comparison unit for comparing the frequency of signals received from a transceiver unit of the second type with the local frequency reference and storing an offset signal based on that comparison in the database; and a processing unit capable of accessing the database and, for each transceiver of the second type, forming a signal representative of the average of the offset signals stored in the database for that transceiver and communicating that offset signal to that transceiver.

The communication system preferably comprises a number of mobile transceiver units that can communicate with a base unit. The system may be capable of determining the location of the tags by means of communications between the mobile transceiver units and the base station. The mobile transceiver units may be tags that can be used to tag objects.

BRIEF DESCRIPTION OF THE DRAWINGS

The present invention will now be described by way of example with reference to the accompanying drawings.

FIG. 4 shows the general architecture of a tag;

FIG. 5 illustrates "continuous" frequency compensation via a feedback loop;

FIG. 7 illustrates frequency compensation using tags to transfer accurate references.

DETAILED DESCRIPTION OF THE INVENTION

Figure 2:
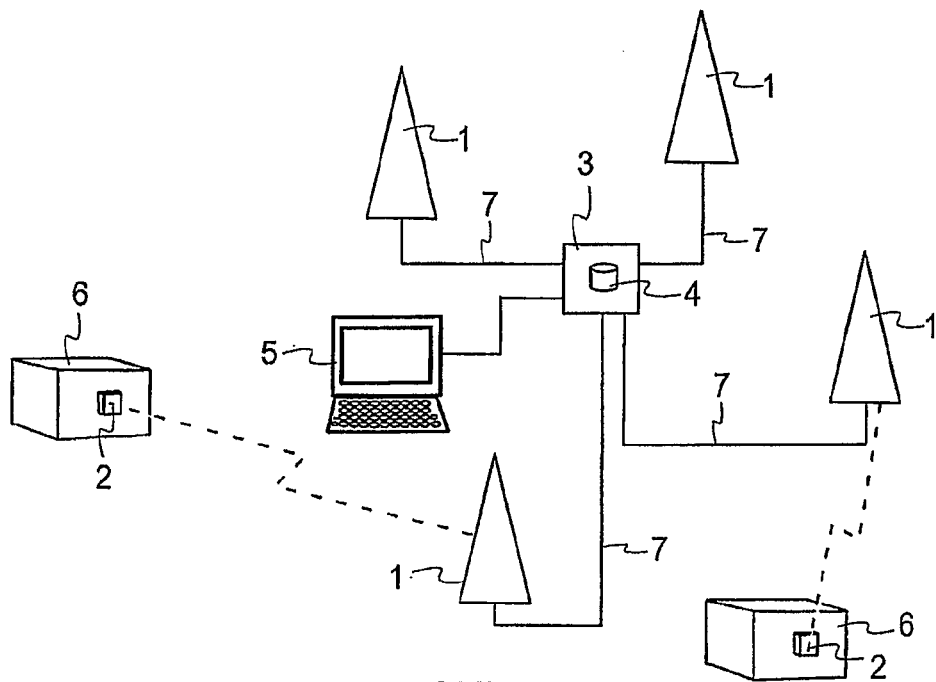
FIG. 2 is a schematic diagram of a radio location system.

FIG. 2 is a schematic diagram of a radio location system. The system comprises a set of base stations 1, which are fixed in place at known locations. The base stations are capable of receiving signals transmitted by tags 2, which are mobile and are in this example each attached to a respective object 6 whose location is to be found by means of the system. The signals received by the base stations are passed to a processing unit 3 which may be a suitably programmed computer. The processing unit processes the signals in a manner to be described below in order to determine the location of any selected tag. The processing unit includes a central database 4. This can be used as described below for assisting synchronisation of the system.

A user of the system can interrogate the processing unit by means of a terminal 5 so as to identify a tag to the processing unit, thereby causing the processing unit to determine that tag's location and to transmit to the terminal 5 the location of the tag for display at the terminal. The location data could, of course, be used in other ways—for instance the processing unit 3 could continuously monitor the locations of the tags and store their locations for later analysis.

Figure 3:
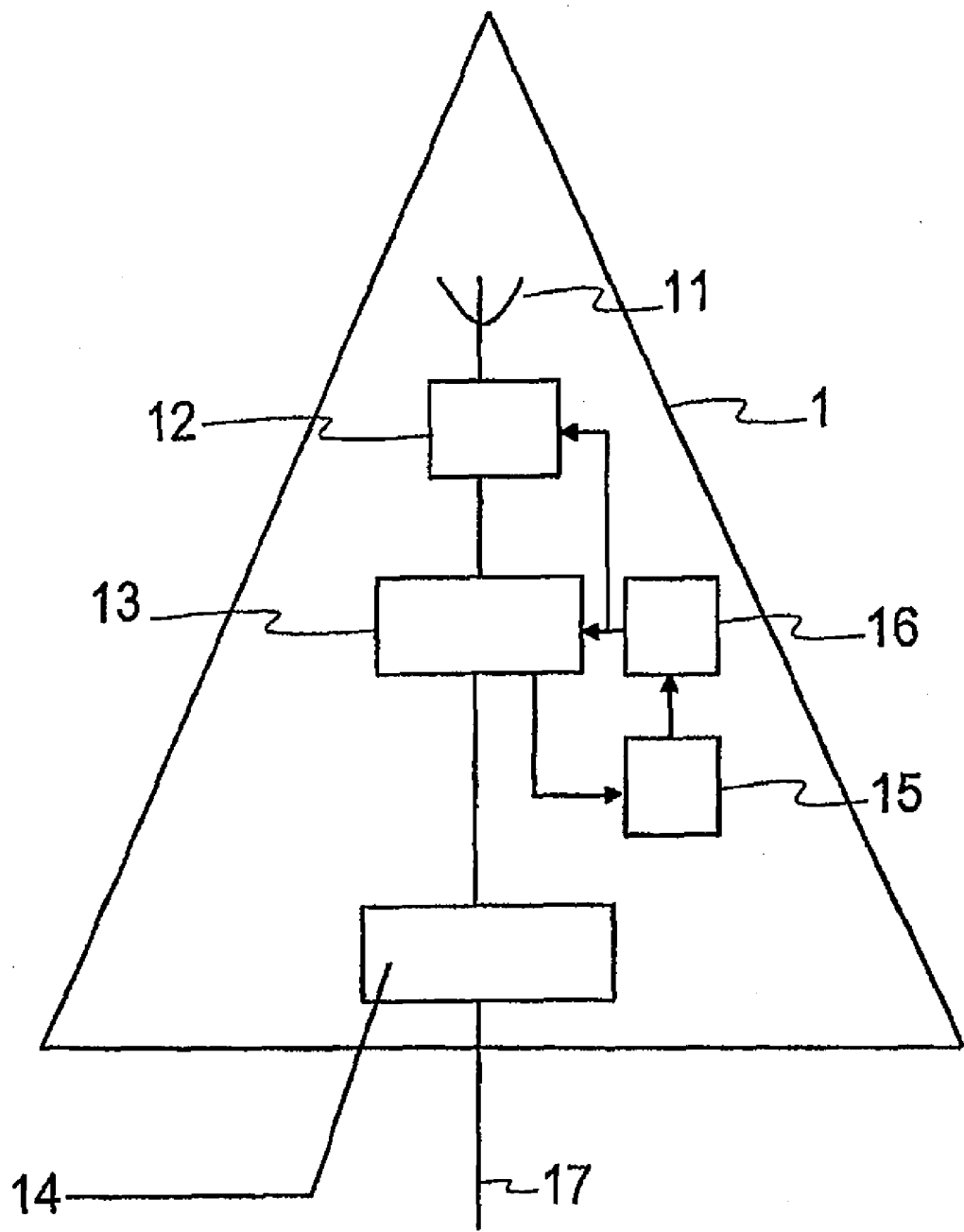
FIG. 3 shows the general architecture of a base station.

FIG. 3 shows the general architecture of a base station. The base station 1 of FIG. 3 includes an antenna 11 connected to a transceiver unit 12. The transceiver unit generates radio frequency signals under the control of a control unit 13 for transmission by the antenna 11, and processes signals received by the antenna to generate resulting baseband signals that are passed to the control unit for baseband processing. The control unit 13 is connected via an interface unit 14 to an external link 17. The base station can communicate via the external infrastructure link with other elements of the infrastructure equipment, such as other base stations or the processing unit 3. A clock 16 controls the operating frequency of the base station and the frequency at which incoming signals are decoded. The base station of FIG. 3 has a clock adjustment controller 15 which provides input to the clock under the control of the control unit 13 so as to adjust the operating frequency of the clock.

FIG. 4 shows the general architecture of a tag. The tag 2 of FIG. 4 includes an antenna 21 connected to a transceiver unit 22. The transceiver unit generates radio frequency signals under the control of a control unit 23 for transmission by the antenna 21, and processes signals received by the antenna to generate resulting baseband signals that are passed to the control unit for baseband processing. A clock 25 controls the operating frequency of the transmissions of the tag and the frequency at which incoming signals are decoded. The tag of FIG. 3 has a clock adjustment controller 24 which provides input to the clock under the control of the control unit 23 so as to adjust the operating frequency of the clock. A battery 26 powers the tag.

As will be discussed in more detail below, it is not necessary for both base stations and tags to have the capability of ongoing clock frequency adjustment. Therefore, the clock adjustment controllers 15, 24 need not be present in both the base station and the tags.

Figure 1:
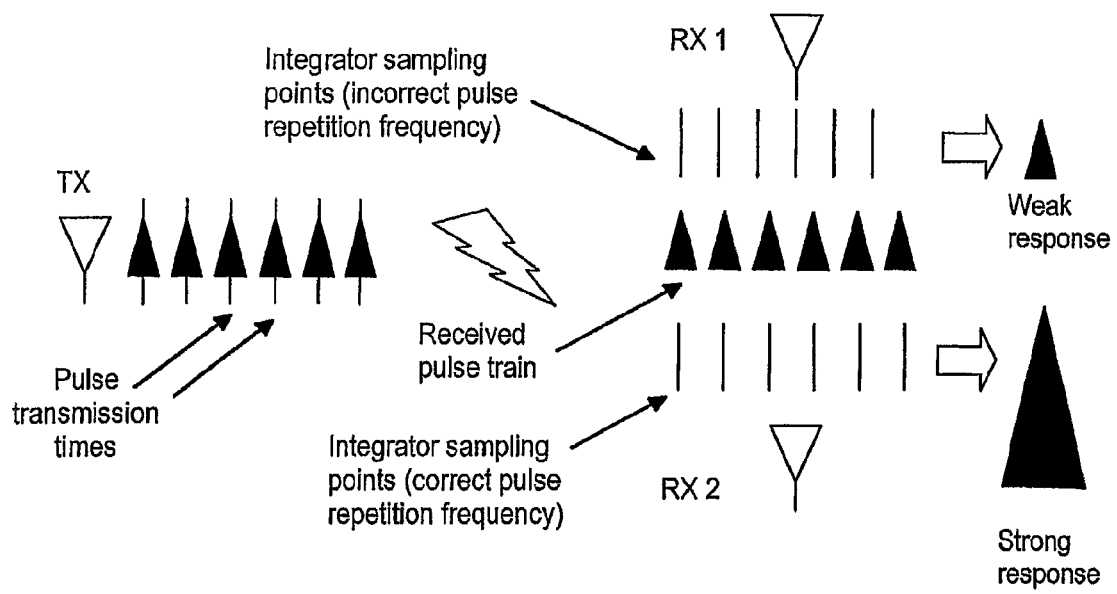
FIG. 1 illustrates the effect of frequency synchronisation on recovery of a received signal.

Ultrawideband (UWB) radio systems structured as shown in FIGS. 2 to 4 can determine the positions of objects to within a few tens of centimeters. When installed in a building, the tags 2 attached to objects 6 emit UWB positioning signals which are picked up by a network of base stations 1 around the building. It is preferred that telemetry and control data can be passed between the tags and the base stations, preferably bidirectionally. This may be done by providing for a control radio channel that can be supported by the base station and tag hardware, for example employing a conventional radio link. The telemetry and/or control data may be passed by any suitable form of remote signalling. The base stations can also preferably communicate with each other and with the processing unit 3 by means of a wired or wireless infrastructure-side data interface, for example connections 7 in FIG. 1 and link 17 in FIG. 2. These links may be direct or via a network, for example a packet-switched network.

Numerous communication methods may be used. In one exemplary implementation of the system, tags and basestations communicate control data over a conventional radio channel. The coverage area of the system is divided into cells—within each cell, one basestation communicates bidirectionally with tags in that cell via a timeslotted radio protocol. Communications channels between tags and basestations in neighbouring cells are separated using frequency-division multiplexing.

Each communication channel timeslot includes a 'downlink' period in which the basestation can send messages to tags in that cell, followed by one or more 'uplink' periods in which tags can send information back to the basestation. Tags attempting to send information back to the basestation choose to transmit information in one uplink period chosen at random—in this way, if multiple tags attempt to send information back to the basestation in the same timeslot, there is a reasonable probability that at least one of them will succeed without interfering with or being interfered by another transmitting tag (assuming that the number of available uplink periods is greater than the number of tags attempting to transmit data in that timeslot). Even if a tag's signal is interfered by another tag in one period, eventually it will succeed in a later period.

In this implementation, each cell has an associated radio positioning channel, which is distinguished from that of neighbouring cells by virtue of a different characteristic pulse repetition frequency (PRF). Within each cell, the channel is shared between tags using a timeslotted protocol. Note that in this implementation the timeslots on the positioning channel need not be exactly aligned with those on the communications channel, but there is a one-to-one correspondence between communications and positioning timeslots. A single tag transmits signals on the positioning channel during a particular timeslot—the tag is selected by the basestation and identified in the message transmitted during the downlink period of the associated communications channel timeslot (which must have been received before the start of this positioning timeslot). Note that it is not necessary for the positioning signal to convey any information regarding the identity of the tag—this can be deduced by the basestation, which knows which tag transmitted positioning signals in which timeslot.

Other communications and positioning protocols may be used to implement the system.

As indicated above, there is a need for frequency synchronisation between the base stations and the tags: i.e. for the operating frequencies of the base stations and the tags to be maintained the same as each other to within a preferred tolerance. This may conveniently be achieved by adjustment of the reference frequencies at one or both ends. The methods of frequency synchronisation described herein employ a frequency measurement and control feedback loop between the tags and the infrastructure (the base stations). Based on the feedback over this loop the reference frequencies at either or both the tag and the infrastructure ends of the UWB link can be "pulled" (adjusted) to bring both ends into closer frequency synchronisation. The frequency of a typical TCXO can be pulled by up to +/−5 ppm and a typical OCXO by up to +/−1 ppm by electronic adjustment during operation: for example by applying a suitable voltage at a control pin. Therefore, if tags and base stations are equipped with a digital-to-analog converter by means of which such a suitable voltage can be generated under digital control, it is possible to adjust their frequency references in steps of better than 0.04 ppm (=10 ppm/256, for a TCXO). Such an D-to-A converter could serve as the or part of the frequency controller 15 or 24.

It is necessary to determine the degree to which each individual frequency reference (e.g. clock 16, 25) should be pulled, and in what direction. The pulse repetition frequency or carrier frequency on which a device in the system transmits is representative of the device's current reference frequency.

A device receiving such transmitted signals can therefore analyse the received signals, determine the PRF or carrier frequency and therefore the reference frequency that it represents, and compare that with its own reference frequency. In some embodiments one or more other characteristics of the signal may be individually or collectively representative of the reference frequency. For example, the transmission scheme may be such that the phase of the signal relative to a reference clock and/or the amplitude of the signal may be indicative of the reference frequency. In an example in which the PRF is representative of the reference frequency and in which tags transmit to receiving base stations, as part of the process of locating a tag the system may measure the precise value of the tag PRF (accurate to around 0.02 ppm), and can derive the current frequency value of the reference used by the tag relative to the local base station reference. This information can then be used in a number of ways to achieve frequency control within the system. These ways will be described below.

1. "Continuous" Frequency Compensation Via a Feedback Loop

If the base station frequency reference is good relative to the time period over which the system is to work (typically, say, an OCXO or a low-ageing TCXO), any offset in the measured tag PRF can reasonably be attributed to ageing of the tag frequency reference. The base station can subsequently communicate with the tag over a conventional wireless link, and inform it of the direction and degree to which its local frequency reference should be adjusted for continued good performance, as shown below. As illustrated FIG. 2, all base stations in the system are generally linked together via a communications system (typically a wired network), and so the base station(s) that determine the correction factor for the tag frequency reference need not be the one(s) which communicate that information to the tag over the conventional wireless link.

In this system, the feedback loop can be operated repeatedly over time to compensate to at least some extent the tag frequency references for the ageing that they have undergone. In this sense, the frequency compensation of this method can be regarded as being "continuous". The compensation may occur periodically or occasionally, but is repeated sufficiently often that the tag frequency reference can be kept within the desired bounds.

The frequency at which updates would be performed would depend on factors such as the exact characteristics of the frequency references (e.g. crystals, TCXO, OCXO) being used, the exact requirements of the positioning system in terms of frequency accuracy. the accuracy to which the tag frequency reference could be determined during remote measurement by the basestation, and the properties of any filter (e.g. an averaging filter) which was to be applied to stored measurements of the tag frequency.

For the purposes of illustration, consider a system which had a total frequency error budget of 1 ppm, a particularly good base station frequency reference (so any error can be attributed to the tag frequency reference), maximum crystal ageing of +/−1 ppm per year, frequency error measurement accuracy of +/−0.25 ppm at the basestation, and no filtering of error measurements at the base station.

Frequency adjustments should be made at the tag more often than once a year, because the tag's frequency reference could drift beyond the limits of system operation within that time. Also, due to the limited measurement accuracy of the basestation it is not feasible to reliably identify (without filtering) any change in the tag frequency reference that might take place in less than three months. In these circumstances, therefore, it might be appropriate to update the calibration of the tag frequency reference a few times per year. In this particular situation, more frequent updates to the tag frequency reference would serve little purpose, but would not be detrimental to system operation. It should be noted, however, that if a complex filtering algorithm incorporating feedback were used in the system, for example by employing a combination of the techniques described herein, updates that were too frequent might cause instability (because any changes that appeared to take place would most likely be due to measurement error at the basestation rather than real changes in the tag frequency reference).

Note that it may be advantageous for base stations(s) to make their assessment of ageing of a particular tag frequency reference on the basis of a set of PRF measurements taken over a period of time. By using multiple measurements, it is possible to filter out the effects of individual readings which may not accurately represent ageing in the tag frequency reference. For example, as a tag is moved around, its temperature may vary significantly, and this temperature change will cause some variation of the tag PRF. If it is assumed that the tag will be exposed to a variety of temperature regimes, one can average several PRF measurements taken over time to help determine the true extent of tag frequency reference ageing, without temperature changes influencing the result. Such readings are suitably separated by periods of, for example, several minutes to several hours.

The period over which frequency readings should be taken to minimise the effects of temperature variations depends on the expected frequency with which tags will be exposed to different temperature regimes. One common situation might be temperature variations due to insolation—a tag placed on a windowsill would experience a range of different temperatures during the day. By taking, say, ten readings over a 24 hour period, the system could reliably determine the true extent of tag crystal ageing independent of the changes in tag operating frequency due to diurnal changes.

This scheme is illustrated in FIG. 5.

2. "Instantaneous" Frequency Compensation

Rather than attempt to adjust the tag frequency reference, the base station frequency reference could be varied. This approach would have the benefits that the tags, for which cost and size are important factors, would need fewer components (for instance tags would not need a D-to-A converter for adjusting the oscillator frequency); and it would not be necessary to use bandwidth on the conventional infrastructure-tag wireless link for transmission of correction coefficients.

Each tag will age at a different rate (and potentially tags will age in different directions: becoming faster or slower), so it will not be possible to apply a 'common' correction to the base station frequency reference that allows it to capture the UWB signal from all tags effectively. However, in some candidate location system architectures, the base stations will know in advance the identity of the tag from which they are attempting to detect a UWB signal during a particular period. For example, tags might be commanded to transmit UWB signals at a particular time by the infrastructure (over a separate radio link), or might transmit their identity over a separate radio link to indicate that they are about to transmit a UWB signal. In these cases, base stations can refer to a database holding current ageing details for that tag, and apply a correction to their frequency reference so that it matches that expected for the tag being located (for the duration of the UWB measurement).

When the base station has corrected its frequency reference, and is measuring the UWB signal from the tag, it can make a new assessment of the offset between the tag and base station references (which should, of course, be zero, if the expected correction value was exactly correct and no additional temperature or ageing drift has occurred). It can use this new information to update (if necessary), the correction value stored in the database.

Figure 6:
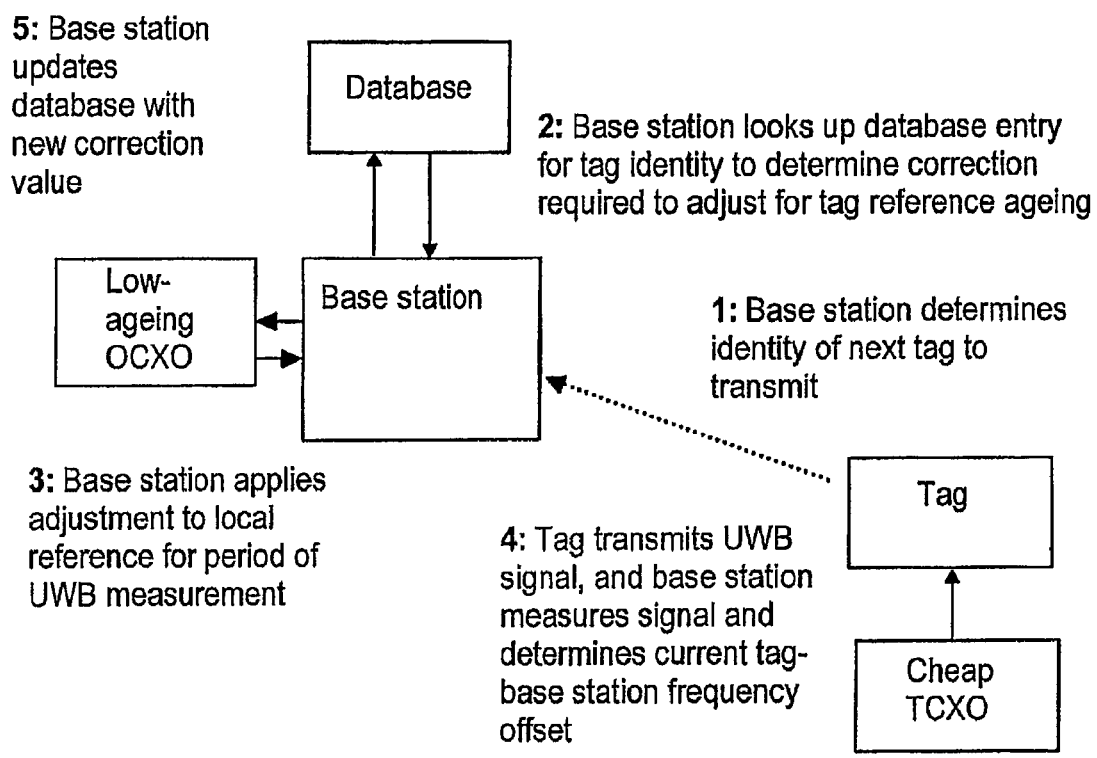
FIG. 6 illustrates "instantaneous" frequency compensation.

FIG. 6 illustrates one example of this method of frequency compensation.

It is worth noting that schemes involving both of the above frequency compensation methods (i.e. compensation at both the tag and base station ends of the UWB link) can be used.

3. Frequency Compensation Using Tags to Transfer Accurate References

The schemes discussed above involve giving base stations access to relatively low-ageing frequency references, so that any (long-term) drift between base station and tag references can be attributed directly to ageing of the tag reference. This may be done by installing an accurate clock at each base station or by synchronising the base stations' clocks with an accurate clock elsewhere in the network using communication links between them.

It might be prohibitively expensive to equip all base stations in the location system with very high-quality timing sources of this type. However, tags will be moved from one area of a building to another during the normal course of system operation, and in the present method such mobile tags can be used as a mechanism for frequency reference transfer.

In the present system one or more base station(s) have access to a relatively high-quality timing source. That/those base stations may be in a specific region of the coverage area of the system (say, an entrance hall). That/those base stations note and/or correct the ageing of the frequency reference in a tag passing through that area, and store the tag identity and time of correction in a database.

If the tag was corrected then when it moves into another area of the building, the base stations in that area query the database, note the fact that the tag has been recently corrected, and assume that no significant ageing has occurred in the intervening period. They can then use their precise measurements of the tag PRF to determine the degree and direction of ageing of their local frequency reference(s). If the tag was not corrected but an offset stored in the database then the base stations in the other area can synchronise themselves to the tag but with the offset stored in the database.

Thus, when a tag for which a record is stored in the database is detected by a base station that does not have access through the infrastructure side to an accurate clock it can perform compensation. On detecting the tag it queries the database to check the last entry of that tag. If there is no entry then no compensation can be performed. If the entry indicates that the tag was corrected when last detected then its frequency can be assumed to be correct, and the base station can synchronise itself to the tag. If the offset of the tag relative to the accurate clock was noted in the database then the base station can synchronise itself to the tag with the offset noted in the database.

Subsequently, the system can correct the frequency references of all tags communicating with those base stations using the newly-adjusted (and relatively accurate) base station frequency reference(s). These tags (or the original tag) may then move to other areas of the building, and the adjustment process will continue.

When using information from a corrected tag to determine whether an update to a basestation frequency reference should be made, it is advantageous to determine whether the tag has been corrected only recently—otherwise, significant ageing of the tag frequency reference may have occurred. The period within which a corrected tag may be considered to have a 'good' frequency reference for the purposes of correcting the basestation frequency reference will depend on the precise ageing characteristics of the tag frequency reference, but for typical TCXOs and OCXOs it may be a period of days, weeks or even months.

Furthermore, to ensure that a basestation frequency reference was not updated using erroneous information from a particularly poor measurement of the current tag frequency (either by the basestation with the good frequency reference, or one of the basestations which subsequently saw that tag), it would be advantageous to combine information (via averaging or other filtering) from multiple measurements of tag frequency (either from a single tag or multiple tags which have been updated recently) before committing to an update of the basestation frequency reference. The number of measurements which should be combined in this way depends upon the accuracy distribution of basestation measurements of tag frequency, and might range anywhere from a few measurements to thousands of measurements.

This scheme may use the techniques described with reference to schemes 1 and 2 above. Once the base station clocks are synchronised with each other they may communicate readily with tags that are also synchronised to the same timebase.

This process is illustrated in FIG. 7.

4. Statistical Correction of Frequency References

To further reduce reliance on very-high-quality timing sources, use can be made of the fact that the references used by individual tags will age by different amounts and in different directions (i.e. faster or slower). Therefore, if a base station covers an area containing a large number of tags, it could be expected (on a statistical basis) that the mean ageing for all tags in that area should be zero. The system can watch the ageing over time of the set of tags in the area—the average ageing of this set should be zero, but will not be because of the ageing of the base station reference. The system can therefore deduce the degree and direction of ageing of the base station reference, and can correct it appropriately. (Of course, this operation will fail to correct for ageing if all the tags in the area happen to age by the same amount in the same direction, but this situation is unlikely). If the tags themselves are being corrected then the base station can make use of a database storing the times at which the tags were corrected and the correction applied to each one, so as to establish the overall trend of drift.

To get a good, statistically significant estimate of the ageing of the basestation frequency reference, it might be necessary for a basestation to average the measured ageing of many (typically at least tens) of tags which are in communication with it. In a practical system in which the tags are mobile, the set of tags seen by the basestation will change over time, as tags move around, but any tag seen by the basestation can contribute to the running average. In certain circumstances, it might be advantageous to restrict collection of data for the purposes of averaging to specific tags or a specific set of tags—for example, if a basestation takes multiple measurements of each tag frequency, and finds a strong diurnal signal due to (say) temperature changes due to insolation, it might discount the readings for that tag from the averaging process, on the basis that temperature effects are contributing strongly to the measurements of that tag's current operating frequency.

Similarly, for a tag which is mobile, and which is seen by many different base station sets (each of which has its own independent frequency reference), the system can monitor the frequency of the tag relative to the base stations. Because the ageing of the base station references should be independent of each others' behaviour and should average to zero, the system can deduce the ageing of the tag reference from the computed average, and correct it appropriately. (Again, this operation will fail to correct for ageing if all the base station references happen to age by the same amount in the same direction, but this situation is unlikely).

The averaging would conveniently be performed by a computing means which was in communications with all the basestations (this might be combined with one of the basestations itself). Again, it might be advantageous to select only measurements from some basestations to improve the statistical properties of the averaged result. To get a good, statistically significant estimate of the ageing of the tag frequency reference, it might be necessary for the computing means to average the measured ageing of many (at least tens) of basestation references which have recently (in the last week, say) communicated with that tag.

Combinations of these two approaches are possible—all tag-base station frequency offset measurements are combined to arrive at corrections for each tag and base station which minimise the maximum offsets between any single tag and single base station in the system.

These approaches do not demand that there is a high-quality frequency reference within the system. However, it is preferable for at least one or some of the base stations to have access to a high quality reference clock. It is preferred that at least tag-infrastructure PRF measurements are recorded (together with the measurement times and the identities of the tags and base stations involved) in a database. Information within that database is subsequently processed by the system to make the statistical inferences required to correct the tag and base station frequency references.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication system comprising:
   one or more transceiver units of a first type;
   a data store accessible to each transceiver unit of the first type;
   two or more transceiver units of a second type, the transceiver units of a second type being capable of communicating with the transceiver units of the first type, and each transceiver unit of the second type comprising a local frequency reference unit on which the frequency of signals transmitted by it are dependent;
   wherein:
   at least one transceiver unit of the first type comprises:
   a frequency comparison unit configured to make a comparison of the frequency of a signal received from a transceiver unit of the second type with a reference frequency and to form an offset signal representative of the offset between the frequency of the signal received from the transceiver unit of the second type with the reference frequency, and
   a feedback unit configured to update the data store with feedback data representative of the offset signal in respect of that transceiver unit of the second type; and
   each transceiver unit of the first type comprises a frequency adjustment unit configured to adjust a transmit and/or receive frequency of the at least one transceiver unit of the first type for communication with one of the transceiver units of the second type in accordance with feedback data stored in the data store in respect of that transceiver unit of the second type.

2. The communication system as claimed in claim 1, wherein each transceiver unit of the first type is arranged to communicate with a single one of the transceiver units of the second type at any one time.

3. The communication system as claimed in claim 1, wherein each transceiver unit of the first type is a base station.

4. The communication system as claimed in claim 1, wherein each transceiver unit of the second type is an identification unit.

5. The communication system as claimed in claim 4, wherein each transceiver unit of the second type has a unique identity within the system.

6. The communication system as claimed in claim 5, wherein each transceiver unit of the second type is a mobile transceiver.

7. The communication system as claimed in claim 6, wherein each transceiver unit of the second type is a radio tag.

8. The communication system as claimed in claim 1 wherein each transceiver unit of the second type comprises a power source.

9. The communication system as claimed in claim 1, wherein the system is a locationing system and is capable of determining the location of a transceiver unit of the second type relative to each transceiver unit of the first type.

10. The communication system as claimed in claim 1, wherein communication between each transceiver unit of the first type and the transceiver units of the second system is by ultrawideband radio.

11. The communication system as claimed in claim 1, wherein the communication system is such that each transceiver unit of the second type can establish communication with each transceiver unit of the first type only if the operating frequencies of those transceiver units are synchronised to better than 2 ppm.

12. A communication system comprising:
    one or more transceiver units of a first type;
    two or more transceiver units of a second type, the transceiver units of a second type being capable of communicating with the transceiver units of the first type, and each transceiver unit of the second type comprising a local frequency reference unit on which the frequency of signals transmitted by it are dependent;
    wherein at least one transceiver unit of the first type comprises:
    a frequency comparison unit configured to compare the frequency of signals received from transceiver units of the second type with a reference frequency and to form an offset signal representative of the average offset between the frequency of the received signals and the reference frequency; and
    a frequency adjustment unit for adjusting the reference frequency in accordance with the offset signal.

13. The communication system as claimed in claim 12, wherein each transceiver unit of the first type is a base station.

14. The communication system as claimed in claim 12, wherein each transceiver unit of the second type is an identification unit.

15. The communication system as claimed in claim 14, wherein each transceiver unit of the second type has a unique identity within the system.

16. The communication system as claimed in claim 15, wherein each transceiver unit of the second type is a mobile transceiver.

17. The communication system as claimed in claim 16, wherein each transceiver unit of the second type is a radio tag.

18. The communication system as claimed in claim 12 wherein each transceiver unit of the second type comprises a power source.

19. The communication system as claimed in claim 12, wherein the system is a locationing system and is capable of determining the location of a transceiver unit of the second type relative to each transceiver unit of the first type.

20. The communication system as claimed in claim 12, wherein communication between the transceiver units of the first type and the transceiver units of the second system is by ultrawideband radio.

21. The communication system as claimed in claim 12, wherein the communication system is such that each transceiver unit of the second type can establish communication with each transceiver unit of the first type only if the operating frequencies of those transceiver units are synchronised to better than 2 ppm.

22. A method for adjusting the transmit and/or receive frequency of a transceiver unit in a communication system comprising one or more transceiver units of a first type, and two or more transceiver units of a second type, the transceiver units of a second type being capable of communicating with the transceiver units of the first type;
    the method comprising:
        making a comparison of the frequency of a signal received by a transceiver unit of the first type from a transceiver unit of the second type with a reference frequency;
        forming an offset signal representative of the offset between the frequency of the signal received from the transceiver unit of the second type with the reference frequency;
        storing feedback data representative of the offset signal in respect of that transceiver unit of the second type; and
        adjusting the transmit and/or receive frequency of the transceiver unit of the first type for communication with one of the transceiver units of the second type in accordance with feedback data stored in respect of that transceiver unit of the second type.

23. A method for adjusting a reference frequency of a transceiver unit in a communication system comprising one or more transceiver units of a first type, and two or more transceiver units of a second type, the transceiver units of the second type being capable of communicating with the transceiver units of the first type, each transceiver unit of the second type comprising a local frequency reference unit on which the frequency of signals transmitted by it are dependent; the method comprising:
        comparing the frequency of signals received from transceiver units of the second type with a reference frequency;
        forming an offset signal representative of the average offset between the frequency of the received signals and the reference frequency; and
        adjusting the reference frequency in accordance with the offset signal.

\* \* \* \* \*

UNITED STATES PATENT AND TRADEMARK OFFICE
CERTIFICATE OF CORRECTION

| | | |
|---|---|---|
| PATENT NO. | : 8,301,162 B2 | |
| APPLICATION NO. | : 12/915325 | |
| DATED | : October 30, 2012 | |
| INVENTOR(S) | : Andrew Martin Robert Ward | |

It is certified that error appears in the above-identified patent and that said Letters Patent is hereby corrected as shown below:

Title page, item (30) insert the following foreign priority information on the first page of the patent:

-- (30) Foreign Application Priority Data

June 2, 2004 (GB) ................................ 0412260.2 --

Signed and Sealed this
Sixteenth Day of July, 2013

Teresa Stanek Rea
*Acting Director of the United States Patent and Trademark Office*